United States Patent
Bae

(10) Patent No.: US 11,023,995 B2
(45) Date of Patent: Jun. 1, 2021

(54) SYSTEMS AND METHODS TO TOGGLE DISPLAY LINKS

(71) Applicant: Apple Inc., Cupertino, CA (US)

(72) Inventor: Hopil Bae, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/542,004

(22) Filed: Aug. 15, 2019

(65) Prior Publication Data

US 2020/0098080 A1    Mar. 26, 2020

Related U.S. Application Data

(60) Provisional application No. 62/734,869, filed on Sep. 21, 2018.

(51) Int. Cl.
*G09G 5/00* (2006.01)
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
CPC ......... G09G 2330/021; G09G 2350/00; G09G 2370/08; G09G 2310/04; G09G 3/3275; G09G 3/3685; G09G 5/006; G09G 2300/0426; G09G 2310/0221; G09G 2340/02; G09G 2340/04; G06F 1/3265; G06F 1/3203; G06F 1/3253; G06F 1/3287
See application file for complete search history.

(56) References Cited

U.S. PATENT DOCUMENTS

| | | | |
|---|---|---|---|
| 8,564,552 B2 | 10/2013 | Kim | |
| 2009/0256868 A1 | 10/2009 | Low et al. | |
| 2011/0242088 A1* | 10/2011 | Kim | G09G 3/3685 345/214 |
| 2015/0130786 A1 | 5/2015 | Saitoh et al. | |
| 2016/0275905 A1* | 9/2016 | Sacchetto | G09G 5/006 |
| 2017/0236466 A1 | 8/2017 | Spitzer et al. | |

OTHER PUBLICATIONS

International Search Report and Written Opinion for PCT Application No. PCT/US2019/048670 dated Nov. 5, 2019; 30 pgs.

* cited by examiner

*Primary Examiner* — Hau H Nguyen
(74) *Attorney, Agent, or Firm* — Fletcher Yoder P.C.

(57) ABSTRACT

Methods and systems for reducing power consumption of a display link by compacting image data to allow the display link to be deactivated for a longer duration. For instance, pixels that correspond to a preset or default value for a display may be omitted from pixel data sent over the display link. Additionally or alternatively, the display link may be divided into multiple lanes that function independently so that a lane of the display link may be deactivated while other lanes are actively transmitting image data.

18 Claims, 12 Drawing Sheets

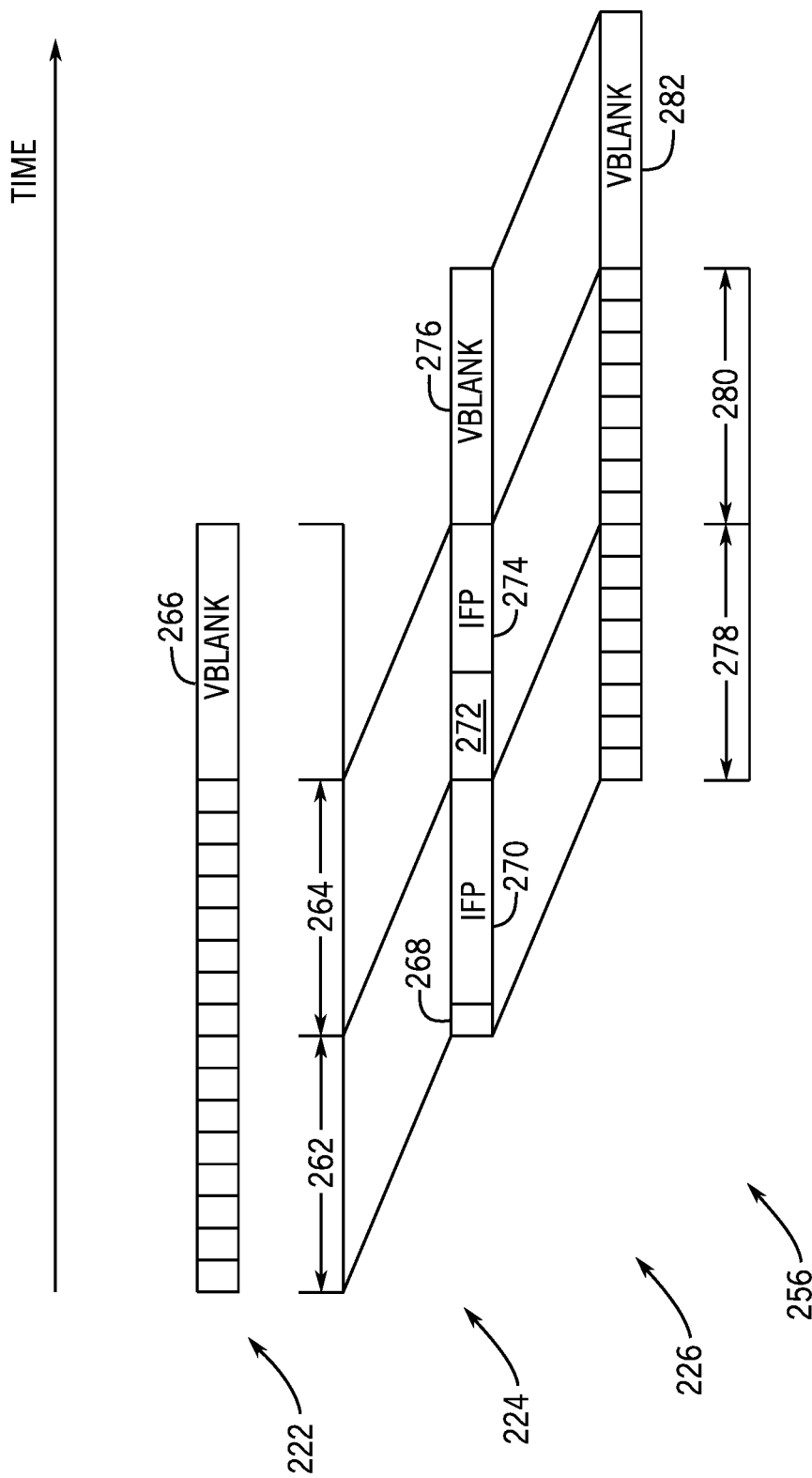

SYSTEMS AND METHODS TO TOGGLE DISPLAY LINKS

CROSS-REFERENCE TO RELATED APPLICATIONS

This application claims priority to U.S. Provisional Patent Application No. 62/734,869, entitled "Systems and Methods to Toggle Display Links," filed Sep. 21, 2018, which this application incorporates in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Displays may receive information from processor(s) over a display link. However, some of the data displayed on the display may be a default/preset value that may be interpreted by the display without explicitly receiving the values. For instance, the default/preset values may include black pixels, white pixels, previous frame values, or any other suitable value. These values may be removed/omitted from image data and still be interpreted properly by the display. In some embodiments, the display link may be divided into multiple lanes where each lane may be activated independently from each other. For example, when a region corresponding to a first lane includes all default/preset values, the first lane may be deactivated during its time for transmission of lines in the region at the same time that a second lane transmits values.

Additionally or alternatively, the image data may be reduced before image processing is performed (e.g., in a pixel pipeline). Furthermore, the processor(s) may dynamically modify a time for transmission of a line (or frame) of image data by immediately starting lines of the image data immediately after all non-default values of a previous line have been transmitted.

Alternatively, the image data may be compacted for a group of lines (e.g., super-line) by removing default values from the image data subsequent to image processing (e.g., in a pixel pipeline) prior to transmission over the display link. The remaining values of the compacted group of lines may be clustered together. During a remainder of a time allocated to the group of lines, the display link may be deactivated. After the compacted data is received by the display, the display may decompact the compacted data by reinserting the omitted pixels before passing the image data to pixel circuitry of the display.

BRIEF DESCRIPTION OF THE DRAWINGS

Various aspects of this disclosure may be better understood upon reading the following detailed description and upon reference to the drawings in which:

FIG. 16 illustrates a timing diagram of a second portion of a frame of image data, in accordance with an embodiment.

DETAILED DESCRIPTION OF SPECIFIC EMBODIMENTS

Figure 1:
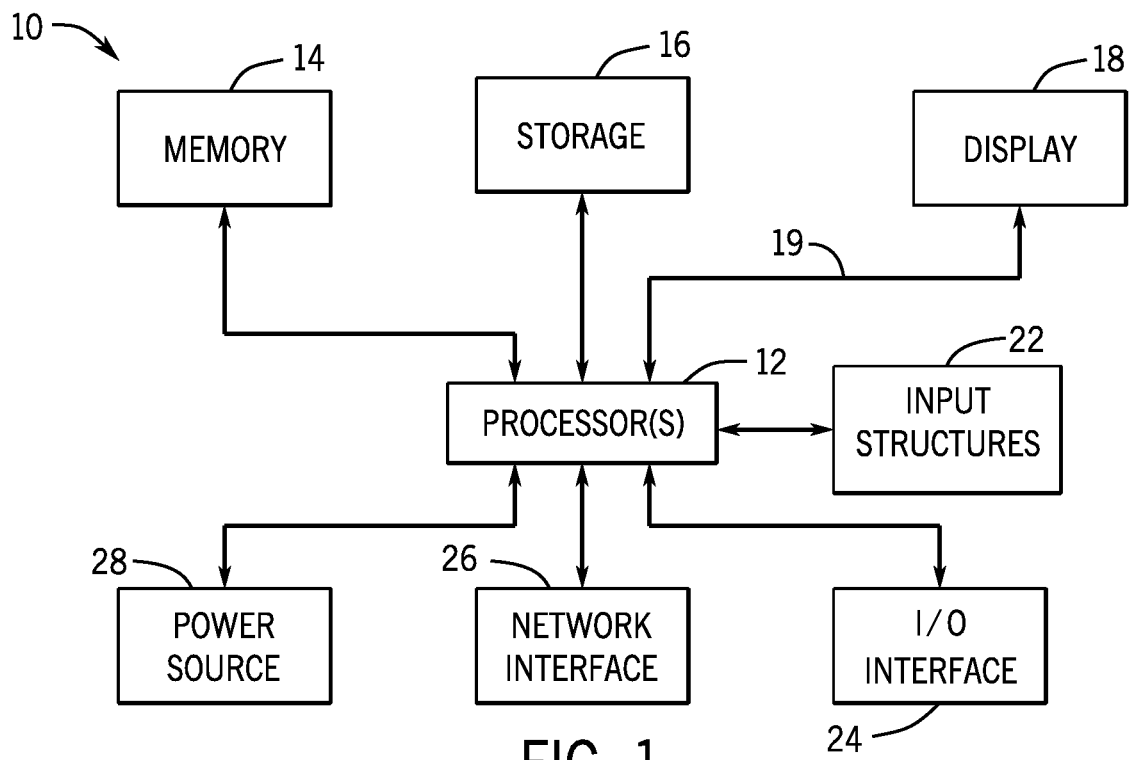
FIG. 1 is a schematic block diagram of an electronic device including a display and a processor coupled via a display link, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electronic devices may include electronic displays that receive image data from one or more processors, such as a graphics processing unit (GPU) or a central processing unit (CPU). The one or more processors may couple to the display panel via a display link. The display link may consume power while active even when image data is not currently being transmitted over the link. Instead, the display link may be made inactive for periods of non-transmission over the display link. However, the duration of the inactivity may not be sufficient to save power over the display link before the display link is to transmit image data for a next image frame. The duration of inactivity may be insufficient to shut down the display link may due to the energy costs associated with toggling the display link off and on, settling time of power signals on the display link, and/or other factors related to the display link.

Thus, to utilize display link deactivation, in some embodiments, the electronic device may divide the display link into multiple lanes where each of the lanes corresponds to a super-column of multiple columns of pixels of the display. For instance, a super-column may be hundreds of pixels wide. When all the pixels in the super-column have a specific value (e.g., white, black, set color, previous value), the corresponding lane in the display link may be deactivated during transmission of image data since the display can interpret no data over the display link as an indication that the specific value is to be written to the pixels in the super-column. Although the application generally refers to columns corresponding to lanes of data received at a time and rows corresponding to lines of image data scanned over time, in some embodiments the data may be received for all rows at one time while the columns correspond to image data scanned over time.

Additionally or alternatively, a partial-display map may be sent with pixel data. The partial-display map may include a code that indicates which pixels correspond to the specific value (e.g., black) or do not correspond to the specific value. Using the partial-display map, the lines of pixel data may be compressed by skipping lines and/or reducing a duration of one or more line-times used to transmit the pixel data and the partial-display map. The partial-display map may also be used to interpret the image content for storage in the pixels.

Additionally or alternatively, the pixel data of pixels having a specific value are omitted from transmission, but a group of lines (e.g., super-line) may have a set transmission duration. Also, the pixel data of pixels having a value different than the specific value may be compacted together in the image data stream before transmission over the display link and decompacted by the display before being written to the pixels while a remainder of the set transmission time may be used to deactivate the display link/lane.

A general description of suitable electronic devices that may include a display, one or more processors coupled to the display over a display link, and corresponding circuitry of this disclosure are provided. In some embodiments, the display may include a backlit display or a self-emissive display, such as an LED (e.g., an OLED) display.

With the foregoing in mind, there are many suitable multi-radio electronic devices that may benefit from the embodiments for granular power control described herein. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
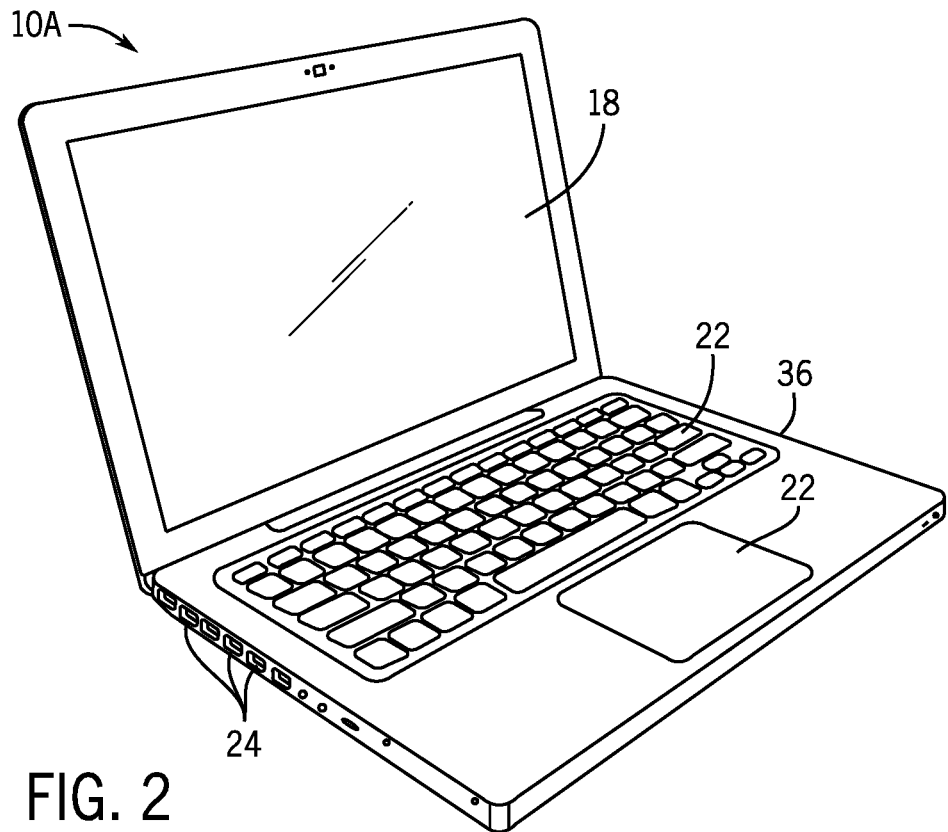
FIG. 2 is a front view of a notebook device representing another embodiment of the electronic device of FIG. 1, in accordance with an embodiment.
Figure 4:
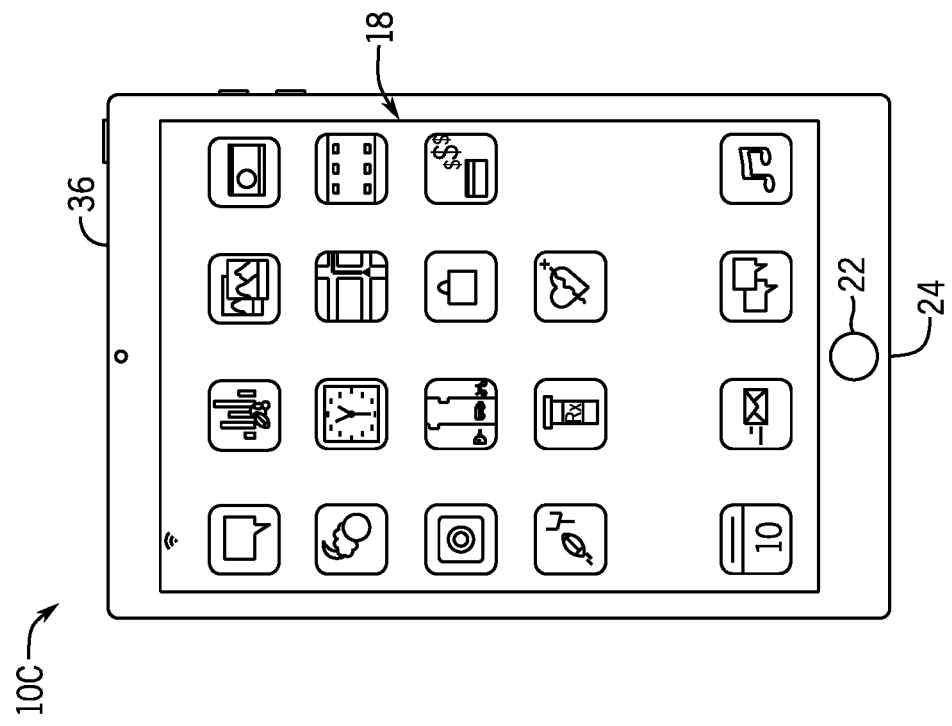
FIG. 4 is a front view of a tablet device representing another embodiment of the electronic device of FIG. 1, in accordance with an embodiment.
Figure 3:
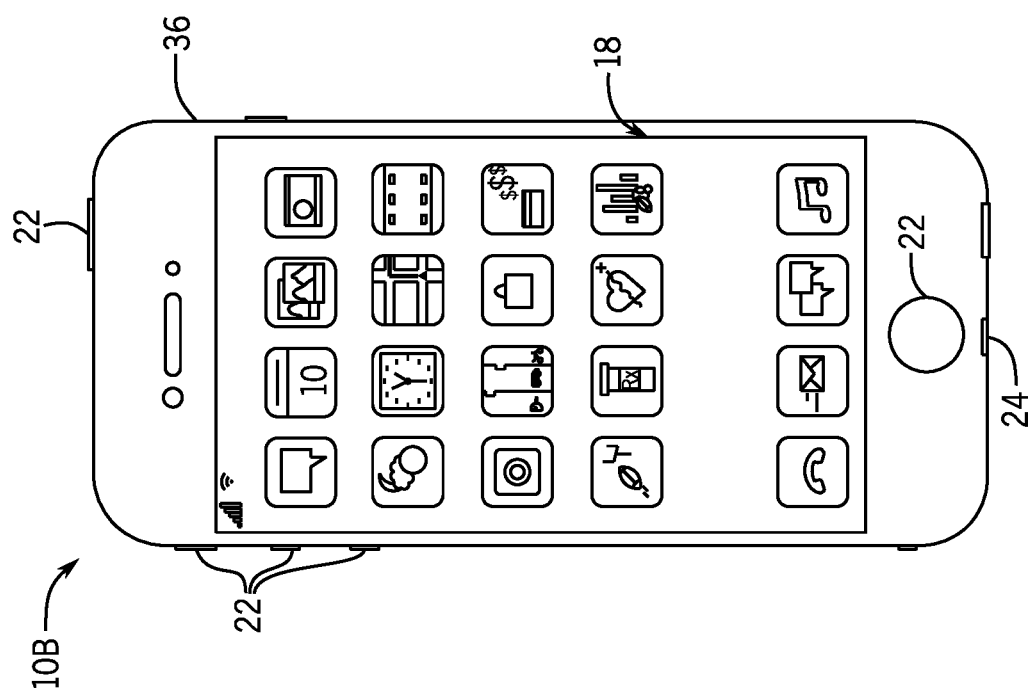
FIG. 3 is a front view of a hand-held device representing another embodiment of the electronic device of FIG. 1.
Figure 5:
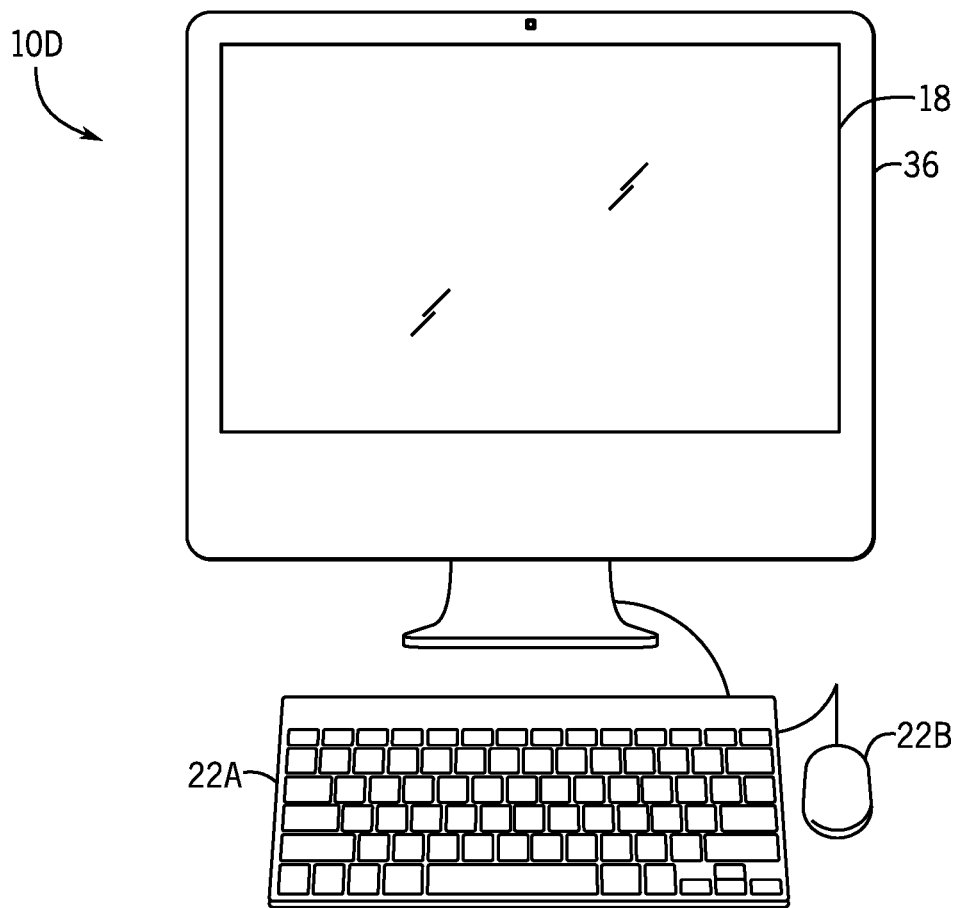
FIG. 5 is a front view of a desktop computer representing another embodiment of the electronic device of FIG. 1.
Figure 6:
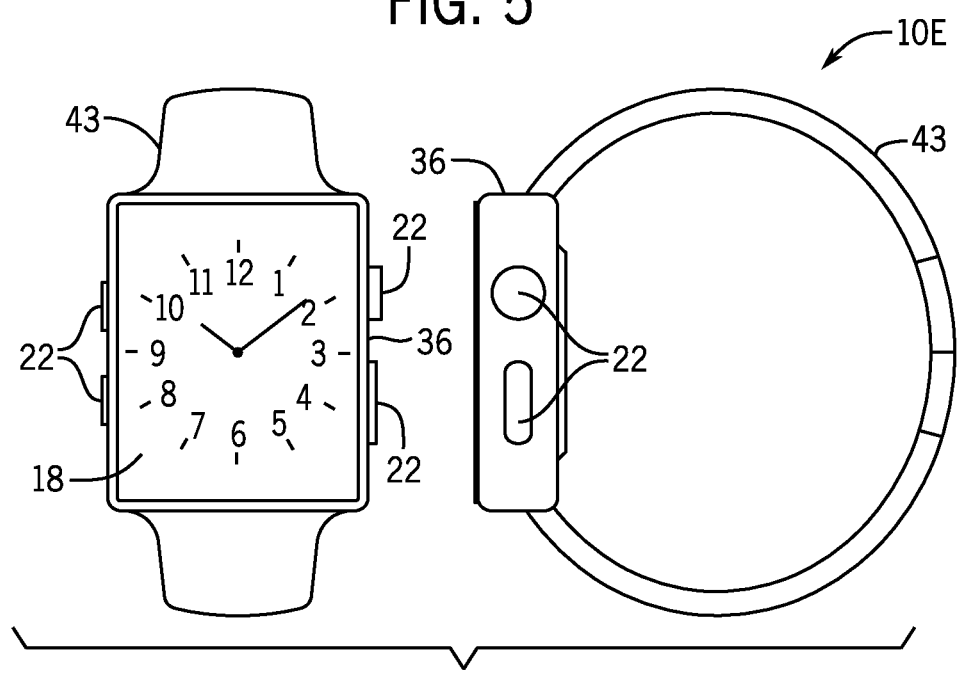
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor (s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The images are displayed using image data generated by the processor 12 that is transmitted to the display via the display link 19. The display link 19 may include any interface through which the image data may be transmitted from the processor 12. In some embodiments, the display link 19 may include any link that may dynamically deactivated during non-transmission periods to save power for the electronic device 10. For example, in certain embodiments, the display link 19 may include a DISPLAYPORT™ (DP) interface. In some embodiments, the display link 19 may include a low-power DP (LPDP) interface, where the LPDP is a low-power implementation of the DP interface. Additionally or alternatively, the display link 19 may include a High-Definition Multimedia Interface (HDMI), a Digital Visual Interface (DVI), a serial interface, a Digital Interface for Video and Audio (DiiVA), HDBaseT interfaces, and/or other suitable video communication interfaces. As discussed below, the image data may be manipulated by the processor 12 to elongate periods of non-transmission to utilize deactivation of the display link 19 during periods where the processor 12 is not transmitting image data over the display link 19.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, universal mobile telecommunication system (UMTS), 4th generation (4G) cellular network, long term evolution (LTE) cellular network, or long term evolution license assisted access (LTE-LAA) cellular network, 5th generation (5G) cellular network, and/or 5G New Radio (5G NR) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. For example, network interfaces 26 may be capable of joining multiple networks, and may employ multiple antennas to that end. As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MACBOOK®, MACBOOK® PRO, MACBOOK AIR®, IMAC®, MAC® mini, or MAC PRO® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the notebook computer 10A, such as to start, control, or operate a GUI or applications running on notebook computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an IPOD® or IPHONE® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal service bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an IPAD® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an IMAC®, A MACBOOK®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input structures 22, such as the keyboard 22A or mouse 22B, which may connect to the computer 10D.

Figure 7:
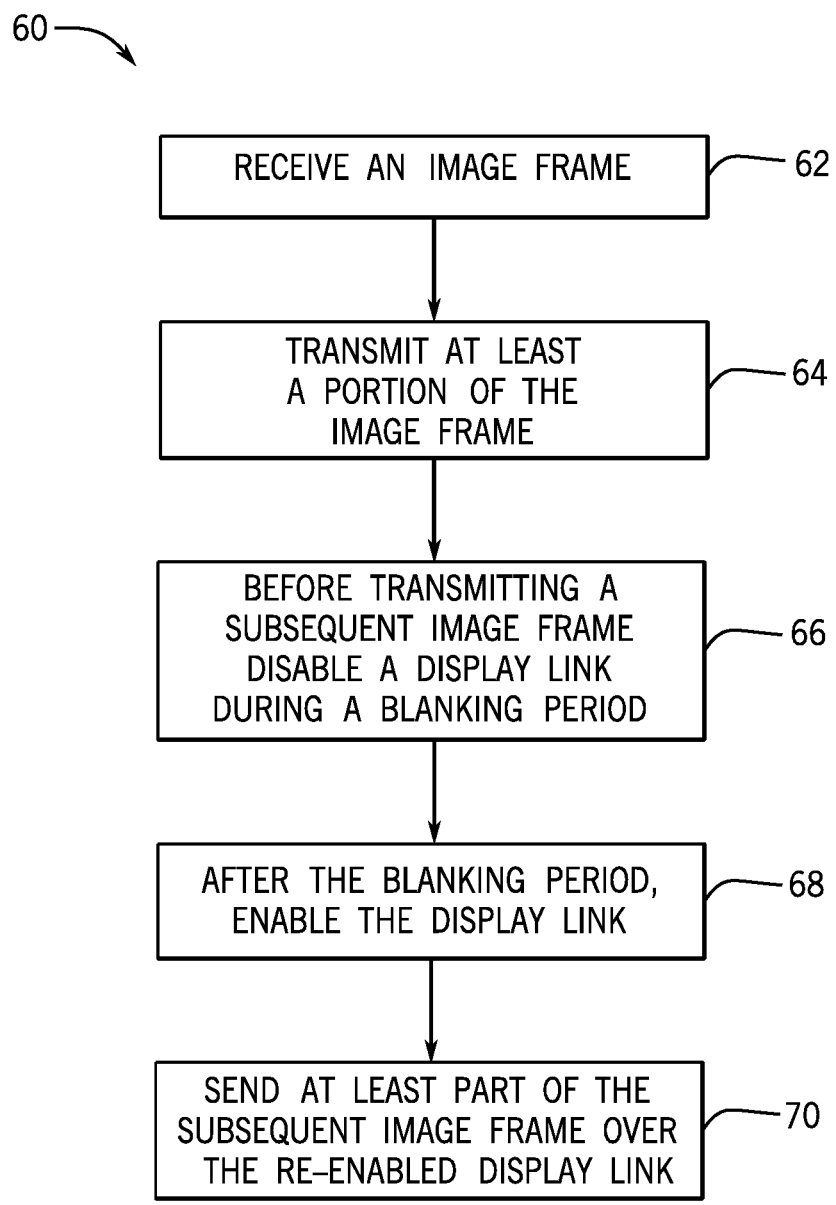
FIG. 7 illustrates a flow diagram of a process that may be employed by the electronic device of FIG. 1 to save power by disabling at least a portion of the display link between transmitting data over the display link, in accordance with an embodiment.

As will be discussed in detail, the electronic device 10 may shutdown the display link 19 (or a portion thereof) for a blanking period. FIG. 7 illustrates a process 60 that may be employed by the electronic device 10 to save power by disabling at least a portion of the display link 19 between transmitting data over the display link 19. The processor 12 receives an image frame (block 62). For instance, the processor 12 may receive the image frame as a frame of streaming data over the network interface 26, as captured image data that is captured using the input structures 22 (e.g., imaging sensing/camera), as stored image data in the memory 14, the storage 16, and/or as generated data that is generated in the processor 12 based at least in part on instructions stored in the memory 14 and/or the storage 16.

The processor 12 then transmits at least a portion of the image frame over the display link 19 (block 64). As discussed below, a portion of the image frame may not be transmitted over the display link 19 if the display 18 may interpret the portion of the image frame without transmission over the display link 19. For instance, the display 18 may have a default (or preset) value for pixels that do not have values transmitted through the display link 19. In some embodiments, this default/preset value may be previously negotiated between the processor 12 and the display 18 before transmitting the image frame over the display link 19. For instance, the processor 12 may omit black pixels from its transmissions over the display link 19. In such embodiments, the display 18 may interpret any pixels of the image frame that are not transmitted over the display link 19 as black pixels. In some embodiments, the processor 12 may omit other colors, such as white or any other specified color, to which the display 18 will interpret pixels without explicit values transmitted in the image data. In certain embodiments, previously transmitted values for respective pixels may be omitted from the transmission such that the display will default to a last transmitted value for pixels that do not receive current values. In other words, the display 18 may include a frame buffer that stores previously transmitted data for pixels where each pixel in the frame buffer remains unchanged if no data in the transmission corresponds to the respective pixels. The framebuffer may store data for an individual line (e.g., row or column) of the pixels of the display 18, and the processor 12 may omit pixel values from the transmission that are the same value from line-to-line of the image. Alternatively, the framebuffer may store data from frame-to-frame (e.g., store an entire image frame), and the processor 12 may omit pixel values from the transmission that are the same value from frame-to-frame of the image data.

In some embodiments, the processor 12 may omit any and all pixels from its transmissions that correspond to the value from transmissions over the display link 19. Alternatively, the processor 12 may only omit transmission of pixel values where the pixels can be grouped together. For instance, pixels of the display 18 may be organized into multiple regions (e.g., super-rows or super-columns) each corresponding to a lane of the display link 19. If all of the pixel values in a region are the default value, the lane may be deactivated for the transmission of the image data (e.g., a line) over the display link 19.

Before transmitting a subsequent image frame, the processor 12 disables at least a portion of the display link 19 during a blanking period (block 66). For instance, the blanking period may be a blanking period for the entire display link 19 or for a lane of the display link 19 where the pixels (e.g., line(s) or entire display 18) are not being written and/or is not displaying data. In some embodiments, the display 18 may sense actions (e.g., touch interactions) interfacing with the display 18.

After the blanking period, the processor 12 re-enables the display link 19 (block 68). For instance, the processor 12 may activate the entire display link 19 from an inactive state or may activate only a portion of the display link that was deactivated by the processor 12 for previous transmissions. Over the re-enabled display link 19, the processor 12 sends at least a portion of the subsequent image frame (block 70).

Figure 8:
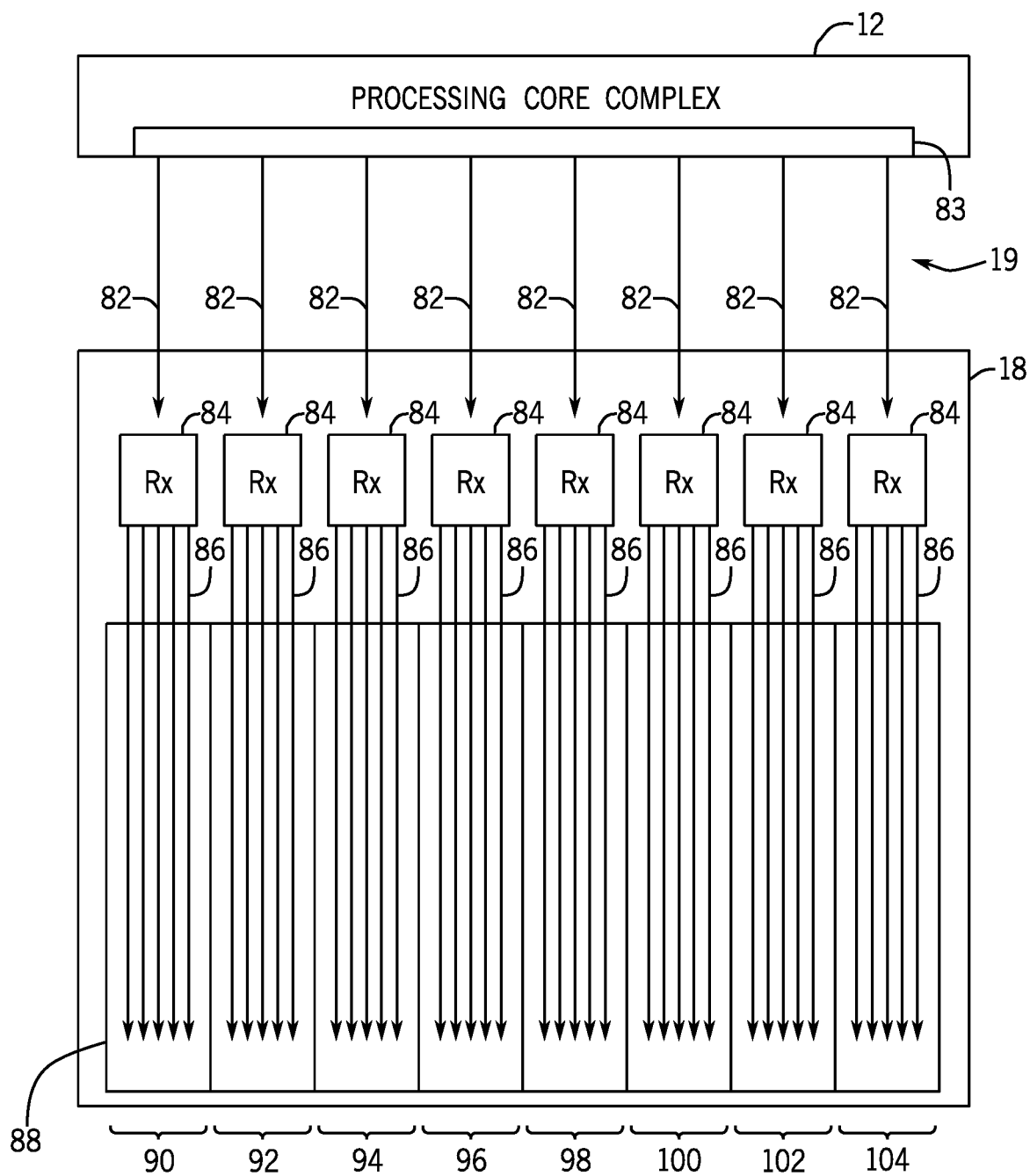
FIG. 8 illustrates a block diagram of a system that includes the display link of FIG. 1 having multiple lanes that the processor interacts with via an interface, in accordance with an embodiment.

FIG. 8 is a block diagram of a system 80 that includes the display link 19 having multiple lanes 82 that the processor 12 interacts with via an interface 83. Each lane 82 is received at a respective receiver 84 and may be used to drive a slice of the display 18 that corresponds to a super-column of multiple columns of pixels extending through the display 18. In other words, each lane 82 may drive a narrow and tall slice of pixels of the display 18. The lanes 82 may function conceptually as independent display links in multiple adjacent, narrow displays working in parallel. Thus, each of the lanes 82 are capable of being placed in an inactive mode independent of whether adjacent lanes 82 are active or inactive. The receivers 84 each divide a respective lane 82 into two or more sub-lanes 86 for a respective region 88. In the illustrated embodiments, the display link 19 includes eight lanes 82, and the regions 88 may include eight regions: regions 90, 92, 94, 96, 98, 100, 102, and 104. In other embodiments, the display link 19 may include more or fewer lanes 82 (e.g., more than 4 lanes 82), and the regions 88 may include a number of regions corresponding to the number of lanes 82. The sub-lanes 86 may each correspond to a column of pixels or to a column of sub-pixels with each column of sub-pixels corresponding to a color (e.g., red, green, or blue). When a lane 82 is active, its sub-lanes 86 may each deliver a respective portion of the image data corresponding to the connected pixels/sub-pixels to write the portion of the image data to the connected pixels/sub-pixels.

In some embodiments, each lane 82 may be deactivated when the lane 82 does not transmit data for its corresponding region (e.g., region 90). For instance, each lane 82 may be evaluated for deactivation in a line-by-line basis. Additionally or alternatively, each lane 82 may be deactivated when a group of lines (e.g., a super-row) does not/will not correspond to any transmitted data. Indeed, in some embodiments, each lane 82 may only be deactivated when the region (e.g., region 90) does not/will not correspond to any transmitted data for an entire image.

Figure 9:
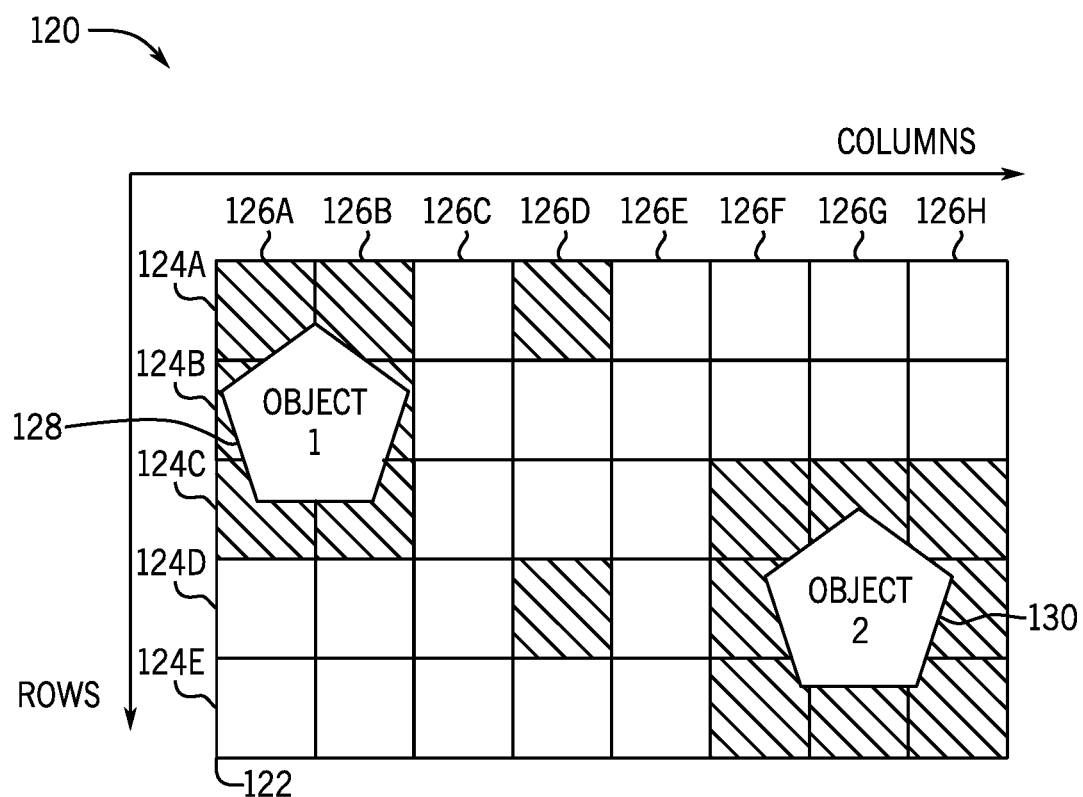
FIG. 9 illustrates a simplified screen diagram that includes a display area that corresponds to a frame of pixel image data for a grid of pixels of the display of FIG. 1, in accordance with an embodiment.

FIG. 9 is a simplified screen diagram 120 that includes a display area 122 that corresponds to a frame of pixel image data for a grid of pixels of the display 18. The frame of image data is arranged into rows of pixels and columns of pixels. The rows may be grouped into super-rows 124 of rows of pixels in the image data. The columns may be grouped into super-columns 126 of rows of pixels in the image data. Each super-column 126 may correspond to a lane 82 of the display link 19 while each row (or super-row 124) is sequentially passed over the lanes 82. For instance, a region of the image data corresponding to super-row 124a and super-column 126a may be sent over a first lane 82 of the display link 19 while a region of the image data corresponding to super-row 124a and super-column 126b may be sent over a second lane 82 of the display link 19. Moreover, a region of the image data corresponding to super-row 124b and super-column 126a may be sent over the first lane 82 of the display link 19 after the data corresponding to super-row 124a and super-column 126a are sent and before a region of the image data corresponding to super-row 124c and super-column 126a is sent over the first lane 82. Alternative to embodiments where lanes 82 of the display link 19 corresponding to super-columns 126 and rows scanned over time, some embodiments of the super-rows 124 may correspond to lanes 82 of the display link 19 while the columns are scanned over time.

As previously discussed, when a region of the image data has all of its pixels corresponding to a default value, the display link 19 may be deactivated (e.g., by the processor 12) during transmission of the corresponding line. Other regions with a portion of the respective region corresponding to a value different than the default value, such as those including objects 128 and 130, may be transmitted over the display link 19. Also, regions where at least one of the pixels corresponds to a different color than the default color may be transmitted over the display link 19. For example, the region corresponding to super-row 124a and super-column 126d and the region corresponding to super-row 124d and super-column 126d may be transmitted over the display link 19. All regions that have only pixels with the default value may be omitted from transmissions over the display link 19 since the display 18 may interpret non-transmission of data as an indication that all pixels of the region are set to the default value. Instead of transmission, during a transmission time for the transmission of the non-transmitted regions, each lane 82 corresponding to a non-transmitted region in the display link 19 may be deactivated to save power. In some embodiments, multiple (e.g., more than 3) lines/regions having the default value are to occur before the lane 82 is deactivated. For instance, if a threshold of regions for deactivation is 3 regions, only the lanes 82 corresponding to super-columns 126c and 126e are to be deactivated during transmission of the image data of the display area 122.

Moreover, a time for transmission of a line (line-time) may remain consistent regardless of whether data is transmitted for the line or not. Instead, lanes 82 of the display link 19 may be disabled without changing a duration of the line-time. Similarly, since a time for transmission of a frame (frame-time) is based on the sum of its constituent line-times, the frame-time may stay consistent regardless of whether the lane 82 is active or deactivated during portions of the frame-time. By keeping the line-times (and frame-times) consistent for default and non-default values, the electronic device 10 is easily able to switch between activated and deactivated states of the lanes 82 of the display link 19 without making timing adjustments.

Figure 10:
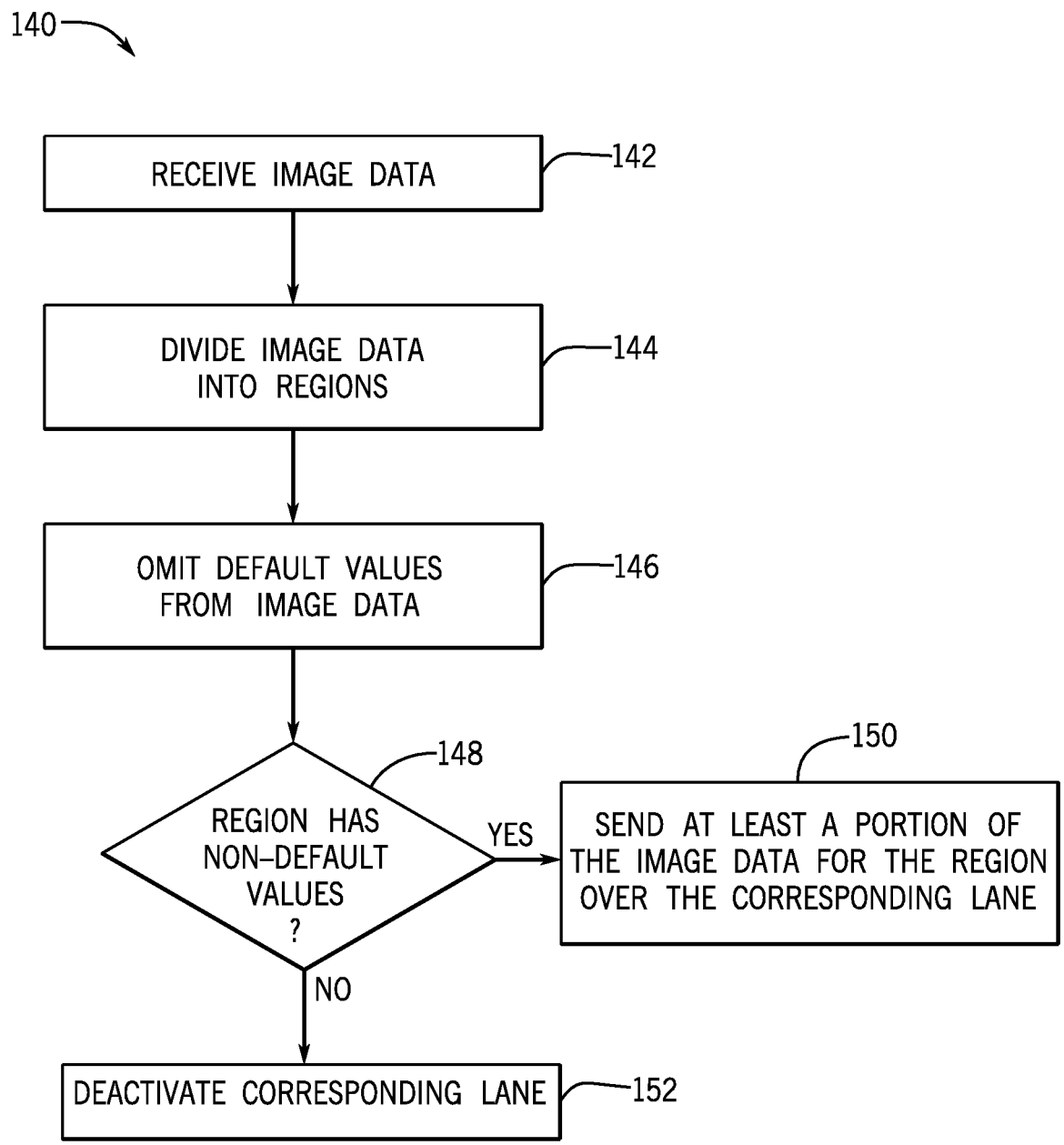
FIG. 10 illustrates a flowchart of a process that may be performed using the system of FIG. 8, in accordance with an embodiment.

FIG. 10 is a flowchart of a process 140 that may be performed using the system 80 of FIG. 8. The processor 12 receives image data (block 142). For instance, the processor 12 may receive the image data as frame(s) of streaming data over the network interface 26, as captured image data that is captured using the input structures 22 (e.g., imaging sensing/camera), as stored image data in the memory 14, the storage 16, and/or as generated data that is generated in the processor 12 based at least in part on instructions stored in the memory 14 and/or the storage 16. The processor 12 divides the image data into any suitable number of regions (block 144). For example, the processor 12 may divide the image data into 40 regions having 8 columns of regions and 5 rows of regions as generally depicted in FIG. 9. Each region corresponds to a lane 82 of the display link 19. For instance, each region in a row of regions may each correspond to different lanes 82 while each region in a column of regions may each correspond to the same lane 82 that are transmitted at different times.

Moreover, each region may be a single line (e.g., row) that is transmitted at one time. Alternatively, to ensure that deactivation saves enough power to justify deactivation, each region may include multiple rows to prevent the corresponding lane 82 from being deactivated unless a threshold number of rows are not transmitted before deactivating the lane 82.

The processor 12 also omits default/preset values from the image data (block 146). The processor 12 then determines whether each region has a non-default/non-preset value in the region (block 148). If the region has at least one non-default value, the processor 12, via the interface 83, sends at least a portion of the image data for the region over the corresponding lane 82 (block 150). For instance, only the non-default/non-preset values are transmitted relying on the display to reinsert default/preset values. In some such embodiments, omitting the default values step may be foregone entirely until a determination is made whether at least any of the pixels of the region correspond to a non-default value. Alternatively, the processor 12 may transmit the entire region over the lane 82. If the region has no non-default values, the processor 12, deactivates the corresponding lane 82 (block 152).

Figure 11:
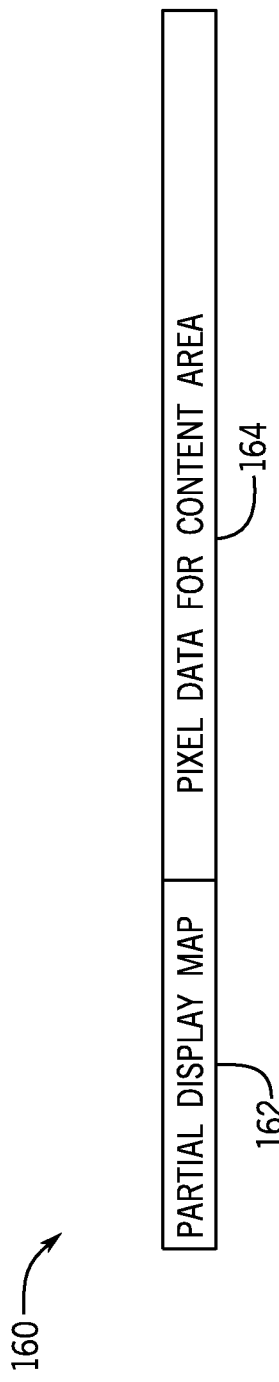
FIG. 11 illustrates a data packet of image data that includes a partial-display map that maps pixel data for non-default content areas, in accordance with an embodiment.

Alternative to deactivating corresponding lanes during a normal transmission time of a line (row, super-row, column, or super-column) with a constant line-time or frame-time, the non-default image data may be consolidated to decrease transmission time and increase a blanking period (e.g., vertical blanking) by dynamically setting a line-time for each line of image data being transmitted to a duration sufficient to transmit the non-default image data in the line. Furthermore, if a whole line is set to a default value, the whole line may be skipped in the transmission until a line with non-default values is to be transmitted. In other words, some lines may have dynamic line-times in transmission and/or may be skipped in the transmission. The dynamic line-time/line skipping may cause a variable frame-time of transmission of the frame of image data. To enable dynamic line-times in transmission and/or line skipping, a partial-display map may be used to interpret where the received pixel data is mapped. For instance, FIG. 11 illustrates a data packet 160 of image data that includes a partial-display map 162 that maps the pixel data 164 for non-default content areas. In other words, the partial-display map 162 may include a code that tells the display 18 to skip certain lines (or parts of lines) in the data received over the display link 19. For instance, the data packet 160 may include the pixel data 164 for a single line, a group of lines (e.g., a super-row or super-column), or other suitable groupings of image data. The pixel data 164 may include only pixel data for pixels that do have a default value associated with them. All other pixels are omitted from the pixel data. The partial-display map 162 may be relatively small compared to pixel data including data for all pixels thereby causing a small overhead that may be more than compensated for by the reduction of pixels included in the pixel data 164 transmitted over the display link 19. For instance, the partial-display map 162 may down-sample the number of pixels. For example, the partial-display map 162 may include 1 bit for each 16 pixels or 125 bits for a 2 k pixel row.

Figure 12:
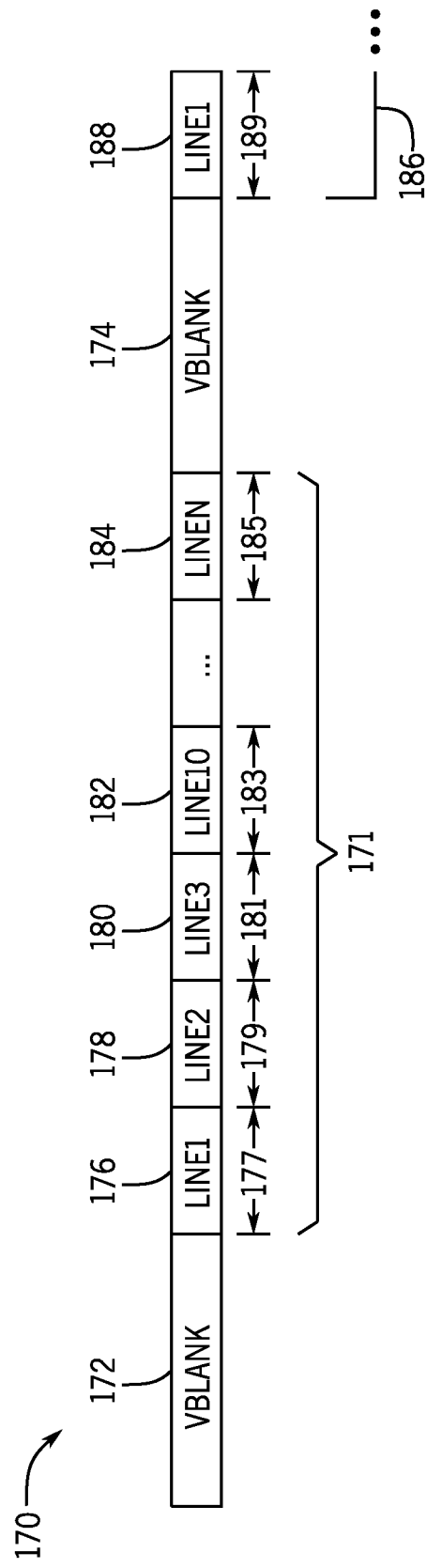
FIG. 12 illustrates a timing diagram showing an embodiment of the pixel data of FIG. 11, in accordance with an embodiment.

FIG. 12 is a timing diagram 170 showing an embodiment of the pixel data 164. The pixel data 164 may have pixel values interposed between blanking periods 172 and 174. For example, the blanking periods 172 and 174 may include vertical blanking periods of the display 18. The timing diagram 170 shows that the transmitted pixel data of a transmitted frame 171 includes a line 176 that a line duration 177. The transmitted frame 171 also includes a line 178 that has a line duration 179, a line 180 that has a line duration 181, a line 182 that has a line duration 183, and a line 184 that has a line duration 185. As illustrated, lines 4-9 are omitted from the transmitted frame 171. The transmission time corresponding to such lines may be shifted to the blanking period 172 and/or the blanking period 174 so that the display link 19 may be deactivated for a longer period during the blanking period 172 or 174 to save reduce power consumption in the electronic device 10.

The line durations 177, 179, 181, 183, and 185 may be the same as each other or different from each other depending on the frame being transmitted. For example, each line may have a maximum duration that is equal to each and every pixel in the line being transmitted over the display link 19, but the duration of each line may vary from the maximum by any number of pixels that correspond to a default value (e.g., black, white, default color). The duration of the frame 171 is equal to the sum of its component line durations. Since the number of lines and/or the duration of each line may change, frame durations may vary from frame-to-frame. For instance, the transmitted frame 171 may have a first duration and a transmitted frame 186 may have a different duration due to each having a different number of component lines transmitted and/or different durations of lines. For instance, the same line of pixels may correspond to the line 176 having the line duration 177 in the transmitted frame 171 and may correspond to a line 188 having a line duration 189 in the transmitted frame 186, where the line duration 177 is different than the line duration 189.

Figure 13:
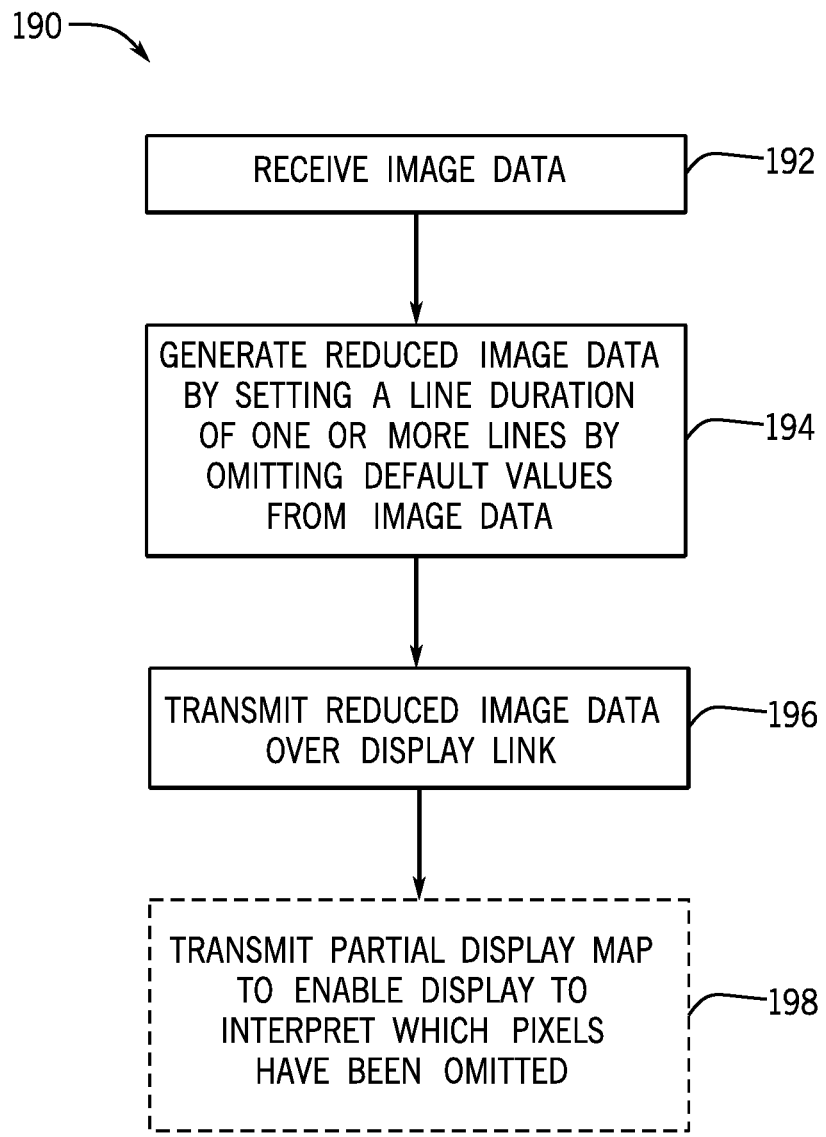
FIG. 13 illustrates a flow diagram a process utilizing dynamic line-times and/or frame-times, in accordance with an embodiment.

FIG. 13 is a flow diagram of a process 190 utilizing the dynamic line-times and/or frame-times. The processor 12 receives image data (block 192). For instance, the processor 12 may receive the image data as frame(s) of streaming data over the network interface 26, as captured image data that is captured using the input structures 22 (e.g., imaging sensing/camera), as stored image data in the memory 14, the storage 16, and/or as generated data that is generated in the processor 12 based at least in part on instructions stored in the memory 14 and/or the storage 16.

The processor 12 then generates reduced image data by setting a line duration of one or more lines by omitting default/preset values from the image data (block 194). Furthermore, in some embodiments, when an entire line consists of default/preset values, the entire line may be omitted from the reduced image data. Alternatively, each line may be assigned some minimum number (e.g., 1) of pixels to be included.

The processor 12 then transmits the reduced image data with dynamic line-times and/or frame-times over the display link 19 (block 196). In some embodiments, the processor 12 may transmit a partial-display map 162 to enable the display 18 to interpret which pixels have been omitted from the image data (block 198). In certain embodiments, the display 18 then uses the reduced image data (and the partial-display map) to write the values in the reduced image data to pixel circuitry of the display 18. In some embodiments, the reduced image data may pass through a pixel pipeline that performs image operations on the reduced image data.

Figure 14:
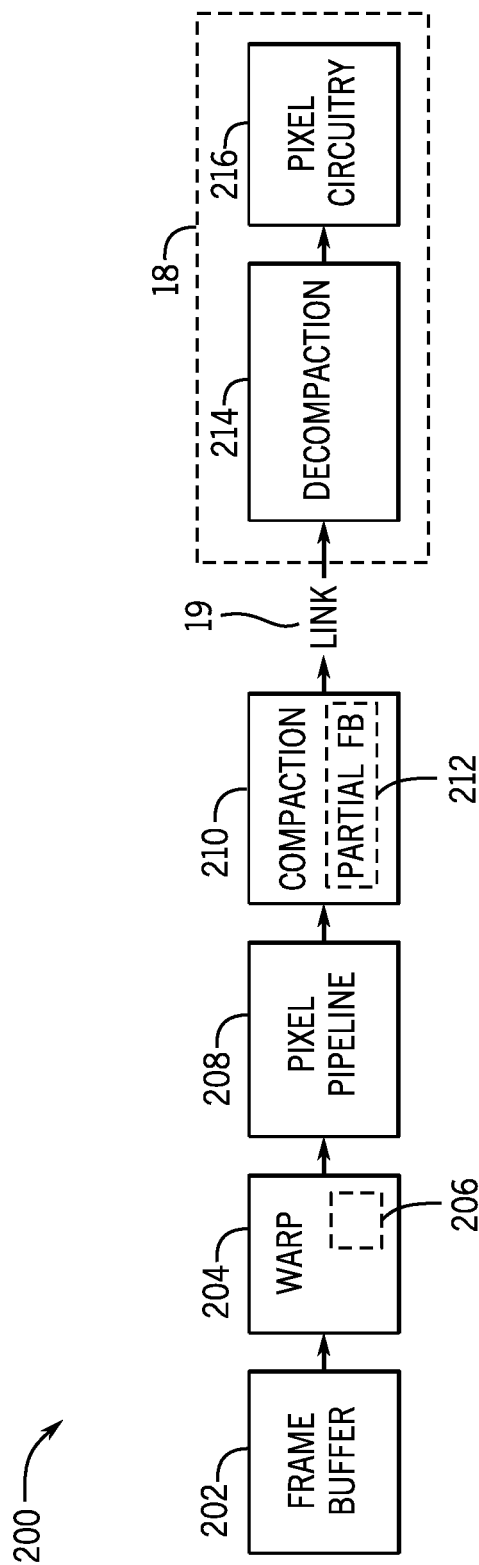
FIG. 14 illustrates a block diagram of a compaction-decompaction process that may be used to compact data before transmission over the display link of FIG. 1 and decompact data after transmission over the display link, in accordance with an embodiment.

Alternative to reducing image data with dynamic line durations, data over the display link 19 may be compacted before transmission and decompacted after transmission while keeping a constant duration for a super-line. FIG. 14 is block diagram 200 of a compaction-decompaction process. A frame buffer 202 of the electronic device 10 may store image data. The processor 12 then may utilize warp logic 204 to warp the image data from the image based on one or more parameters 206, such light balance settings, luminance settings, detected ambient light levels, and/or other relevant features. Additionally or alternatively, the image data may be manipulated in a pixel pipeline 208 based on various factors, such as a determined aging of the display 18. The image data from the pixel pipeline 208 is passed to a compaction block 210 that may be implemented in hardware and/or software to remove pixels from the image data that have the default value so that pixels having the default value are not transmitted over the display link 19. The compaction block 210 may utilize a partial frame buffer 212 to process compaction for a portion of the frame of image data. In some embodiments, the compaction block 210 may inject code that indicates which pixels are omitted from the compacted image data. For example, the partial frame buffer 212 may be used to process image data for a lane 82 of the display link 19. The compacted image data (and corresponding code) is then transmitted over the display link 19 to the display 18. The display 18 includes a decompaction block 214 that may be implemented in hardware and/or software. The decompaction block 214 may receive the compacted image data and insert the default value into missing pixels. For instance, the missing pixel locations may be identified based at least in part on the injected code. Once the missing pixels are reinserted into the decompacted image data, the decompacted image data is transmitted to pixel circuitry 216 of the display 18 to cause display of an image by the display 18.

Figure 15:
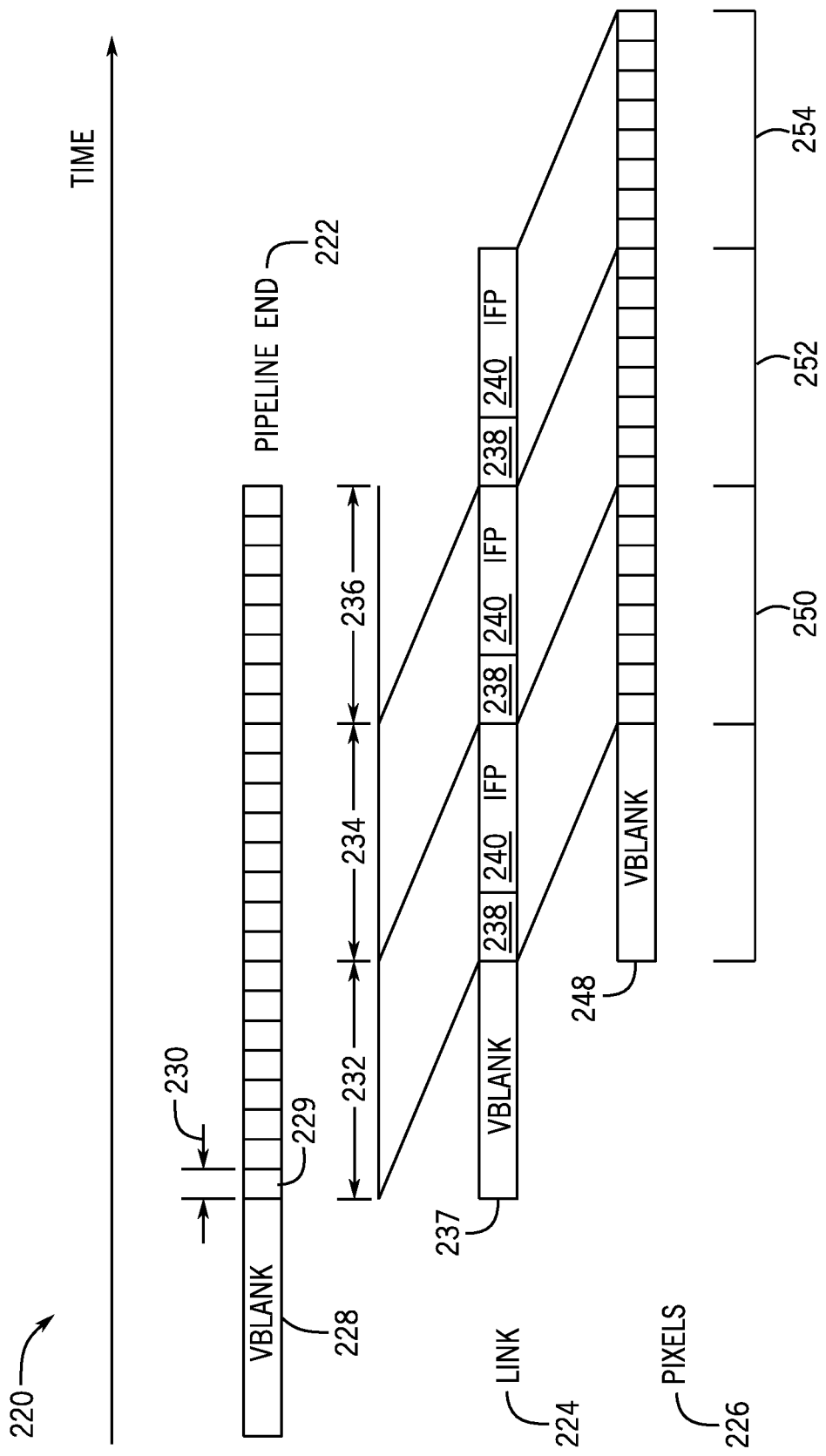
FIG. 15 illustrates a timing diagram of a first portion of a frame of image data, in accordance with an embodiment.

FIG. 15 is a timing diagram 220 of a portion (e.g., a beginning) of a frame of image data. The timing diagram 220 includes a pipeline end line 222 that corresponds to an output of the pixel pipeline 208. The timing diagram 220 also includes a link line 224 that corresponds to an output from the compaction block 210 that is transmitted across the display link 19. The timing diagram 220 also includes pixels line 226 that corresponds to the data output from the decompaction block 214 and transmitted to the pixel circuitry 216 with the pixel data omitted for transmission over the display link 19 re-added back to the image data before transmission to the pixel circuitry 216 and after receipt over the display link 19.

The pipeline end line 222 shows that a frame of image data may include a blanking period 228 followed by a series of lines 229 of data, wherein each constituent pixel line 229 corresponds to a row or column of pixels. Each constituent pixel line 229 also has a line duration 230 with data values for each pixel in the constituent pixel line 229. As previously noted, pixels having a default value (e.g., white, black, default color) may be omitted from transmission with only pixels having the non-default value. However, each line duration 230 may be too short to shutdown the display link 19 for power saving even when the line has only a small amount of data to be sent during the line duration 230. Instead, a number of lines 229 may be grouped together in a super-line to increase a length of a continuous period of deactivation of the display link 19 to increase power saving. The number of lines 229 in a super-line may be equal to any suitable grouping, such as the illustrated eight lines or tens or hundreds of lines 229 per super-line. Each super-line has a duration equal to the sum of its constituent line durations 230. For instance, at the end of the pixel pipeline 208, durations 232, 234, and 236 are each equal to a sum of eight line durations 230.

In data transmitted over the display link 19, as illustrated by the link line 224, a blanking period 237 may have a same duration as the blanking period 228. However, all of the non-default value pixels in each super-line may be grouped together into compacted lines 238 of data with a remainder of each super-line having an in-frame period (IFP) 240 of blanking. By combining the non-default value pixels of multiple lines in a super-line, the IFP 240 may have a duration longer than the line duration 230 enabling more power saving than deactivating a lane 82 or the display link 19 for all or a portion of a line duration 230.

In data transmitted to the pixel circuitry 216, as illustrated by the pixels line 226, a blanking period 248 may have a same duration as the blanking periods 228 and 237. Also, as illustrated, the decompaction block 214 re-adds the omitted pixels back in to the image data, such that all pixels are repopulated and durations 250, 252, and 254 in the pipeline end line 222 appear the same as durations 232, 234, and 236 in the pipeline end line 222.

FIG. 16 is a timing diagram 256 that shows another portion (e.g., an end) of the frame of the image data of FIG. 15. After the frame, a blanking-period 266 occurs between frames of the image data output from the pixel pipeline 208. The timing diagram 256 depicts super-line durations 262 and 264. The super-line duration 262 may be divided into compacted lines 268 with an IFP 270 where the display link 19 may be deactivated to save power. Similarly, the super-line duration 264 may be divided into compacted lines 272 and IFP 274. As illustrated, the IFP 270 and the IFP 274 may have different lengths that are based at least in part on an amount of pixels in the constituent pixel lines 229 that have a default value. The more pixels of a super-line having the default value may increase a duration of a respective IFP (and decreases a duration of the corresponding compacted lines duration). Once the last super-line is transmitted, a blanking period 276 may occur.

When the omitted pixels are added back into the image data, each constituent pixel line 229 has a same duration long enough to enable passage of each pixel of a line of pixel data. In other words, each constituent pixel line 229 at the pixels is the same as a corresponding constituent pixel line 229 exiting the pixel pipeline 208. For example, durations 278 and 280 may appear the same as durations 262 and 264. The pixels may then be non-emissive during a blanking period 282 at the pixel circuitry 216.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure. Furthermore, it should be further understood that each of the embodiments disclosed above may be used with any and all of the other embodiments disclosed herein. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

Definitions:

Physical Environment

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-Generated Reality

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object (s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual Reality

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment, through a simulation of the person's presence within the computer-generated environment, and/or through a simulation of a subset of the person's physical movements within the computer-generated environment.

Mixed Reality

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented Virtuality

An augmented virtuality (AV) environment refers to a simulated environment in which a virtual or computer generated environment incorporates one or more sensory inputs from the physical environment. The sensory inputs may be representations of one or more characteristics of the physical environment. For example an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

What is claimed is:

1. A system comprising:
an interface configured to interface with a display link having a plurality of lanes each configured to transmit a corresponding portion of image data over the display link to a display; and
a processor configured to:
omit pixels from the image data that correspond to a default value;
output the image data over the display link via the interface, wherein the processor is configured to deactivate a one or more lanes of the plurality of lanes when the one or more lanes is not transmitting data for one or more lines of the image data; and
transmit a partial-display map with the image data to enable the display to interpret which pixels have not been omitted from the image data and to translate omitted pixels to the default value.

2. The system of claim 1, wherein the display link comprises a display port link.

3. The system of claim 1, wherein the plurality of lanes comprises at least four lanes.

4. The system of claim 1, wherein the processor is configured to divide a frame of the image data into regions, wherein each region corresponds to a respective lane of the plurality of lanes and to the one or more lines.

5. The system of claim 1, wherein the default value is a white value for the omitted pixels, a black value for the omitted pixels, or another color value for the omitted pixels.

6. The system of claim 1, wherein the processor is configured to condense pixels together not corresponding to the default value, wherein the condensed pixels originate from multiple lines of pixels in the image data to form a super-line.

7. The system of claim 6, wherein no space occurs between transmission of condensed pixels across the multiple lines in the super-line.

8. A method comprising:
generating reduced image data from image data by dynamically setting a line duration of each line of one or more lines of the image data by removing pixels corresponding to a default value from the image data and condensing the remaining pixels, wherein the default value is a value that a display is configured to assign to pixels in the image data that are not assigned a value in the image data;
transmitting the reduced image data over a display link from a processor to the display; and transmitting a partial-display map with the reduced image data to enable the display to interpret which pixels have not been removed from the image data and to translate removed pixels to the default value.

9. The method of claim 8, wherein generating the reduced image data comprises skipping an entire line of the one or more lines in the transmission of the image data, wherein the entire line comprises pixels corresponding to the default value.

10. The method of claim 8, wherein the default value comprises a default color.

11. The method of claim 10, wherein the default color comprises white color or a black color.

12. The method of claim 8, wherein the default value comprises a previous value for a corresponding pixel stored in a framebuffer of the display.

13. A system comprising:
a frame buffer configured to store image data;
a pixel pipeline configured to receive the image data from the frame buffer and to process the image data;
a compaction circuitry configured to:
  receive the processed image data from the pixel pipeline and to compact the processed image data inside each super-line of the image data by removing any pixels from the processed image data that correspond to a preset value and clustering the remaining pixels in the super-line, wherein each super-line is a group of lines of the pixels that has a set transmission duration for the entire respective super-line;
  transmit a partial-display map with the processed image data to enable a display to interpret which pixels have not been removed from the image data and to translate the removed pixels to the preset value; and
an interface configured to send the compacted, processed image data to the display over a display link.

14. The system of claim 13, wherein the preset value is a value that the display is configured to assign to pixels that are not assigned a value in the compacted, processed image data, wherein the preset value comprises a black value, a white value, a preset color value, or a previous value stored in the frame buffer of the display.

15. The system of claim 13, comprising the display having pixel circuitry configured to display the image data.

16. The system of claim 15, wherein the display comprises a decompaction circuitry configured to:
receive the compacted, processed image data from the display link;
reinsert omitted default values into pixels that were removed by the compaction circuitry in the compacted, processed image data; and
transmit decompacted image data with the reinserted default values to the pixel circuitry.

17. A system comprising:
a frame buffer configured to store image data, wherein the stored image data comprises a plurality of regions of columns of pixels and each region of the plurality of regions corresponds to a lane of a plurality of lanes of a display link;
a pixel pipeline configured to receive the image data from the frame buffer and to process the image data;
a compaction circuitry configured to:
  receive the processed image data from the pixel pipeline and to compact the processed image data for each region of the plurality of regions by compacting image data corresponding to one or more lines of the respective region of the image data by removing any pixels from the processed image data that correspond to a preset value and by clustering the remaining pixels in the one or more lines of the region;
  transmit a partial-display map with the processed image data to enable a display to interpret which pixels have not been removed from the image data and to translate removed pixels to the preset value; and
an interface configured to send the compacted, processed image data to the display over the display link.

18. The system of claim 17, comprising a processor configured to deactivate a deactivated lane of the plurality of lanes when a respective regions has only pixels corresponding to the preset value.

* * * * *